(12) United States Patent
Heusala

(10) Patent No.: US 6,850,560 B2
(45) Date of Patent: Feb. 1, 2005

(54) DATA TRANSMISSION METHOD, TERMINAL EQUIPMENT AND DATA TRANSMISSION SYSTEM

(75) Inventor: Hannu Heusala, Oulu (FI)

(73) Assignee: FINoC Design Consulting Oy, Oulu (FI)

(*) Notice: Subject to any disclaimer, the term of this patent is extended or adjusted under 35 U.S.C. 154(b) by 727 days.

(21) Appl. No.: 09/771,619

(22) Filed: Jan. 30, 2001

(65) Prior Publication Data

US 2001/0021185 A1 Sep. 13, 2001

(30) Foreign Application Priority Data

Mar. 13, 2000 (FI) ............................................. 20000575

(51) Int. Cl.$^7$ ................................................ H04B 1/38
(52) U.S. Cl. .................... 375/222; 370/360; 370/410
(58) Field of Search ................................. 375/222, 358

(56) References Cited

U.S. PATENT DOCUMENTS

| | | | |
|---|---|---|---|
| 5,243,593 A | * 9/1993 | Timbs | ......................... 370/360 |
| 5,613,190 A | 3/1997 | Hylton | |
| 5,613,191 A | 3/1997 | Hylton et al. | ................. 455/3.1 |
| 6,021,158 A | 2/2000 | Schurr et al. | |
| 6,298,064 B1 | * 10/2001 | Christie | ...................... 370/410 |

FOREIGN PATENT DOCUMENTS

| | | |
|---|---|---|
| WO | WO 99/18712 | 4/1999 |
| WO | WO 00/04475 | 1/2000 |
| WO | WO 00/04476 | 1/2000 |

OTHER PUBLICATIONS

Finnish Patent Office Action re: 20000575 mailed Feb. 23, 2001.
Maxwell, "Asymmetric Digital Subscriber Line: Interim Technology for the Next Forty Years," IEEE Communications magazine, Oct. 1996, pp. 100–106.

* cited by examiner

Primary Examiner—Stephen Chin
Assistant Examiner—Sudhanshu C. Pathak
(74) Attorney, Agent, or Firm—Pillsbury Winthrop LLP

(57) ABSTRACT

The invention relates to a data transmission method, terminal equipment and data transmission system which comprises a first transceiver (299) and a second transceiver (201). The first transceiver comprises a transceiver (141a) which is arranged to receive a broadband xDSL signal, to modulate a carrier with the received xDSL signal, and to transmit the modulated carrier over the air path to the second transceiver (201). The second transceiver (201) comprises a transceiver (141b) which is arranged to receive the carrier transmitted by the first transceiver and to demodulate the xDSL signal modulated into the carrier. The second transceiver (201) comprises a DSL block (196) which is arranged to remove the xDSL format of the demodulated xDSL signal.

17 Claims, 10 Drawing Sheets

DATA TRANSMISSION METHOD, TERMINAL EQUIPMENT AND DATA TRANSMISSION SYSTEM

FIELD OF THE INVENTION

The invention relates to a data transmission method used in a data transmission system comprising a first transceiver and a second transceiver.

BACKGROUND OF THE INVENTION

Conventional data transmission systems and telephone systems, such as land line telephone systems, radio telephone systems and mobile telephone systems, become faster in their data transmission properties all the time. Different systems and devices which enable for instance the introduction of new services become available at quite a fast rate. The introduction of services is, however, slowed down by the fact that the data transmission rate between a service provider and user is relatively slow. In addition, at least some systems require complex control and base station equipment to function, and their construction is economically a very expensive investment.

Data transmission can be relatively fast in one section of the system, but it can be said that the data transfer rate between a base station and terminal equipment, for instance, is still relatively low. It can also be noted that it is today not yet possible to transfer quickly enough as much data to the terminal equipment as required to provide the user as extensively as possible with different services which function sufficiently quickly from the user's point of view.

Publication U.S. Pat. No. 5,613,190, for instance, discloses a system which is made up of service providers, a broadband data transmission link, a distribution point in the customer's premises and user terminals. The data to be transmitted is broadband information from the service provider to the customer. Signal distribution at subscriber end takes place through an air interface between a transponder and a second transponder in the terminal. The terminals are assumed to be fixedly installed. In the premises of the subscriber to the service, there is a transponder which transforms received broadband information to an RF signal to be transmitted to the air interface. The transponder can be connected to a broadband network employing ADSL technology, for instance, in which case the RF air interface is between two complete ADSL modems. The ADSL technology used in the publication provides a transfer rate of 1.5 Mbit/s in the downlink direction.

Publication U.S. Pat. 6,021,158 discloses a data transmission system which comprises a micro wave link connected to a broadband network, through which bi-directional broadband data is transmitted by the point-to-multipoint principle to points from which it is distributed by twisted-pair copper cables to the customers. The data transmission system comprises DSL modems. The publication relates to the selection and allocation of the frequency band for the wireless section on the basis of the channel capacity and signal quality.

Publication WO 00/04475 discloses a method of processing e-commerce data, and publication WO 00/04476 discloses an e-commerce telephone. DSL technology can be utilized in the solutions disclosed in the publications.

BRIEF DESCRIPTION OF THE INVENTION

It is thus an object of the invention to implement a method and a system and terminal equipment implementing the method so as to reduce the above-mentioned problems to provide subscribers with versatile services quickly and efficiently. This is achieved by a method of the type described in the preamble, which is characterized by receiving a broadband xDSL signal with a first transceiver, modulating a carrier with the received xDSL signal, transmitting the modulated signal over the air path from the first transceiver to a second transceiver, and demodulating the modulated signal again into an xDSL signal after reception.

The object of the invention is also achieved by a method of the type described in the preamble, which is characterized by receiving a broadband xDSL signal with a first transceiver, removing the xDSL format of the signal in the first transceiver, modulating a carrier with the resulting signal in the first transceiver, and transmitting the modulated signal over the air path to a second transceiver.

Further, the object of the invention is achieved by a method of the type described in the preamble, which is characterized by receiving a broadband xDSL signal with a first transceiver, removing the xDSL format of the signal in the first transceiver, and transmitting the resulting signal either over the air path or by cable from the first transceiver to a second transceiver which can be disconnected from the first transceiver.

The invention also relates to terminal equipment.

The terminal equipment of the invention is characterized in that the terminal equipment comprises a frame part which comprises a DSL block for removing the xDSL format of an xDSL-format signal received by the terminal equipment, a part which can be disconnected from the frame part and comprises a memory for storing the information in the deformatted signal, the DSL block being arranged to generate an xDSL signal and to transfer the generated xDSL signal outside the terminal equipment.

In addition, the terminal equipment of the invention is characterized in that the terminal equipment comprises a DSL block for generating a signal in xDSL format, a transceiver which is arranged to modulate a carrier with the xDSL-format signal, to transmit the modulated carrier to the air path and to receive and demodulate a modulated carrier, and the DSL block is arranged to remove the format the demodulated xDSL signal.

Further, the terminal equipment of the invention is characterized in that the terminal equipment comprises a frame part which comprises a transceiver for receiving an xDSL-format signal from the air path and for transmitting an xDSL signal to the air path, and a part which can be disconnected from the frame part and which comprises a DSL block for generating a signal in xDSL format and for removing the format of an xDSL signal received from the air path, the part also comprising a transceiver for receiving an xDSL-format signal from the air path and for transmitting an xDSL signal to the air path.

The invention also relates to a data transmission system which comprises a first transceiver and a second transceiver.

The system of the invention is characterized in that the first transceiver comprises a DSL block which is arranged to receive an xDSL signal and to remove the xDSL format, the first and second transceiver comprise a connection means to connect the first and the second transceiver to each other and to disconnect them from each other, the second transceiver comprises a memory which is arranged to store the xDSL signal whose format has been removed by the DSL block, and the second transceiver is arranged to transfer information to the xDSL block of the first transceiver, which is arranged to generate an xDSL signal, to which the xDSL block is arranged to input the information coming from the second transceiver, the data transmission system comprises a cable coupled to the first transceiver for connecting the first transceiver to the data transmission system, and the first transceiver is arranged to transmit the xDSL signal it has generated to the data transmission system by said cable.

In addition, the system of the invention is characterized in that the first transceiver comprises a transceiver which is arranged to receive a broadband xDSL signal, to modulate a carrier with the received xDSL signal, and to transmit the modulated carrier over the air path to the second transceiver, the second transceiver comprises a transceiver which is arranged to receive the carrier transmitted by the first transceiver and to demodulate the xDSL signal modulated into the carrier, and the second transceiver comprises a DSL block which is arranged to remove the xDSL format of the demodulated xDSL signal.

Further, the system of the invention is characterized in that the data transmission system comprises a server and a transceiver which is arranged to receive a signal from the server and to generate an xDSL signal, to which the transceiver is arranged to input the signal received from the server, the transceiver is arranged to transmit the xDSL signal to the first transceiver, both the first and the second transceiver comprise their individual connection means for galvanically connecting the first and the second transceiver to each other, the first transceiver is arranged to transmit the signal received from the transceiver either in the xDSL format or without the xDSL format the air path or through the connection means to the second transceiver, the second transceiver is arranged to transmit the signal to the first transceiver either in the xDSL format or without the xDSL format over the air path or through the connection means, the first transceiver is arrange to form the xDSL format and to input the signal received from the second transceiver into the xDSL format, if the signal received from the second transceiver was transmitted without said format, the first transceiver is arranged to transmit the xDSL-format signal to the transceiver which is arranged to remove the format of the received xDSL-format signal and to transmit the signal inside the format to the server.

Preferred embodiments of the invention are disclosed in the dependent claims.

The invention is based on transmitting over the air path an xDSL signal or a signal whose xDSL format has been removed, whereby the data transmission rate to portable terminal equipment, for instance, can be made high. In addition, the invention is based on forming a cellular network, in which base stations are implemented by transceivers which are coupled with telephone plug boxes and to which a connection is established by an xDSL signal which is transmitted to the terminal equipment either by cable or over the air path.

The method, system and terminal equipment of the invention provide several advantages. The invention makes possible a new kind of connection having a very fast data transmission rate from portable terminal equipment to the service provider, for instance. Conventional telephone lines are used in the data transmission. The terminal equipment of the invention can be a portable telephone, for instance, which is able to establish a very fast connection to the other parts of the system using an xDSL signal. Because a part of the system, i.e. the land line network, already exists, a cellular network employing fast data transmission can economically be implemented by means of the invention.

A transceiver acting as a base station in the system of the invention is connected to a conventional telephone plug box, in which case it is not necessary to increase the number of conventional base stations. The connection used between the terminal equipment and the transceiver acting as a base station is implemented by an xDSL signal which is transmitted over the air path, in which case the terminal equipment can be used like a mobile phone. The terminal equipment can function as a telephone, for instance, to which an xDSL signal is transmitted by cable or over the air path, thus allowing a fast transmission and reception of very large quantities of data from and to the telephone.

Thus, the implementation of the system does not require large investments, because a large number of telephone lines already exists. Real-time video signals can, for instance, be received by the terminal equipment. It is also possible to transmit very large quantities of data at a high data transmission rate from the terminal equipment to the network. In the system of the invention, the size of the cells can be made relatively small, whereby it is easy to find out the position of the terminal equipment.

BRIEF DESCRIPTION OF THE FIGURES

In the following, the invention will be described by means of the preferred embodiments and with reference to the attached drawings, in which.

DETAILED DESCRIPTION OF THE INVENTION

Figure 1:
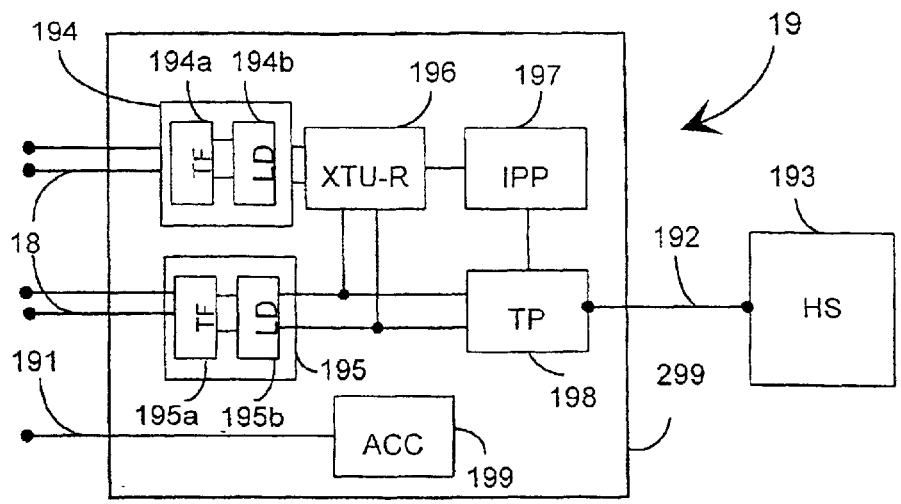
FIG. 1 shows one embodiment of the terminal equipment of the invention.

FIG. 1 shows a first embodiment of the terminal equipment TE of the invention. To be more precise, the embodiment shown in FIG. 1 is a fixed DSL telephone. The terminal equipment is suited for packet-switched data transmission in particular.

The terminal equipment 19 comprises a frame part 299 and a handset 193. The handset is connected by a wire 192 to the frame part 299. The frame part 299 of the terminal equipment shown in the figure is connected to cables, i.e. conductors 18. The terminal equipment comprises a power source 199 which can be a battery, for example. The power source 199 is connected by a wire 191 outside the frame part, and for example charging current for the battery can-be supplied over the wire 191 to the power source.

The terminal equipment also comprises a block 194 which comprises a line transformer 194a and line driver 194b. The terminal equipment also comprises a block 195 corresponding to the block 194 and comprising a line transformer 195a and a line driver 195b. Further, the terminal equipment comprises a DSL block 196, an IPP (Internet Packet Phone) block 197 and a block 198. The block 198 comprises the electronics required for implementing a conventional land line telephone.

The DSL block 196 is, in practice, an xDSL model of the subscriber end. The terminal equipment receives a signal from the conductors 18 and transmits to the conductors 18 a signal which is in xDSL format. xDSL technology comprises the following technologies: ADSL (Asymmetric Digital Subscriber Line), RADSL (Rate Adaptive DSL), SDSL (Symmetrical DSL), HDSL (High bit rate Digital Subscriber Line) and VDSL (Very high bit rate DSL). Thus, the DSL block can function as an ADSL modem (ATU-R), HDSL modem (HTU-R or H2TU-R), VDSL modem (VTU-R) or a voice-frequency modem, for instance.

xDSL technology is especially well-suited for data transmission systems, in which the need to transfer data in one direction of transfer is considerably bigger than in the other direction of transfer. Usually, a user downloads considerably larger quantities of data from the network than what he or she transmits to the network. Thus, the user is able to establish connections having very high data transmission rates using terminal equipment, such as a mobile phone, employing the xDSL technology. At its fastest, the xDSL technology can achieve a data transmission rate of several tens of megabits. A typical application is, for instance, to connect to a server located in a network by means of an xDSL telephone. It is possible to download data from the server to the telephone at a high data transmission rate. By means of the telephone, it is also possible to transmit data to the network at a high data transmission rate.

It is possible to establish for instance a real-time or nearly real-time image connection by means of the terminal equipment. In addition, a fast data transmission connection to different multimedia services, video conferences and other services requiring high-capacity data transfer can be established by means of the terminal equipment.

Figure 2:
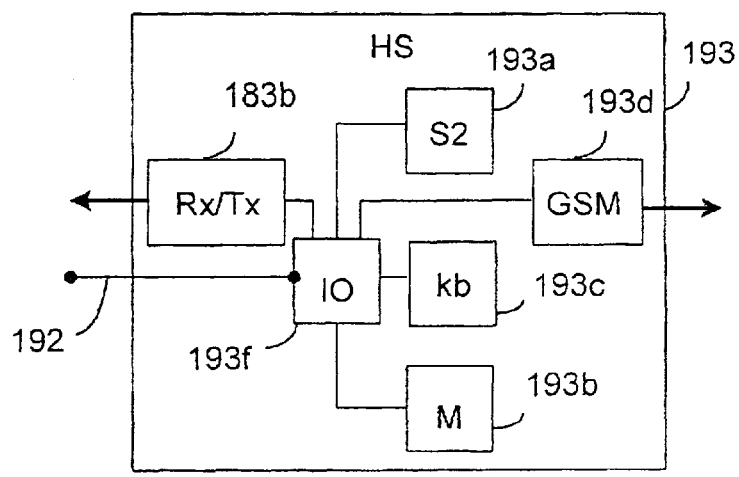
FIG. 2 shows an embodiment of a handset.

FIG. 2 shows in greater detail an embodiment of the handset 193. FIG. 2 shows that the handset 193 comprises an earpiece 193a and a microphone 193b. The presented embodiment also comprises a means 193c which is used for instance for the selection of numbers, letters and other symbols. The means 193c comprises keys, for instance.

The embodiment shown in FIG. 2 also comprises a means 193d for transmitting and receiving a radio signal. The means 193d is arranged to transmit and receive a signal according to the GSM or CDMA system, for instance. In practice, the means 193d comprises components according to prior art for implementing a mobile phone. It is thus possible to contact conventional mobile phones, for instance, by means of the handset.

Further, the embodiment shown in FIG. 2 comprises a transceiver 183b and an input/output port 193f, to which a cable 192 is connected. The transceiver 183b is arranged to transmit a signal over the air path to the frame part 299. Signals propagating by the cable 192 from the frame part to the handset and vice versa are transmitted through the input/output port. The input/output port 193f is connected through signal paths to each functional block of the handset.

Figure 3:
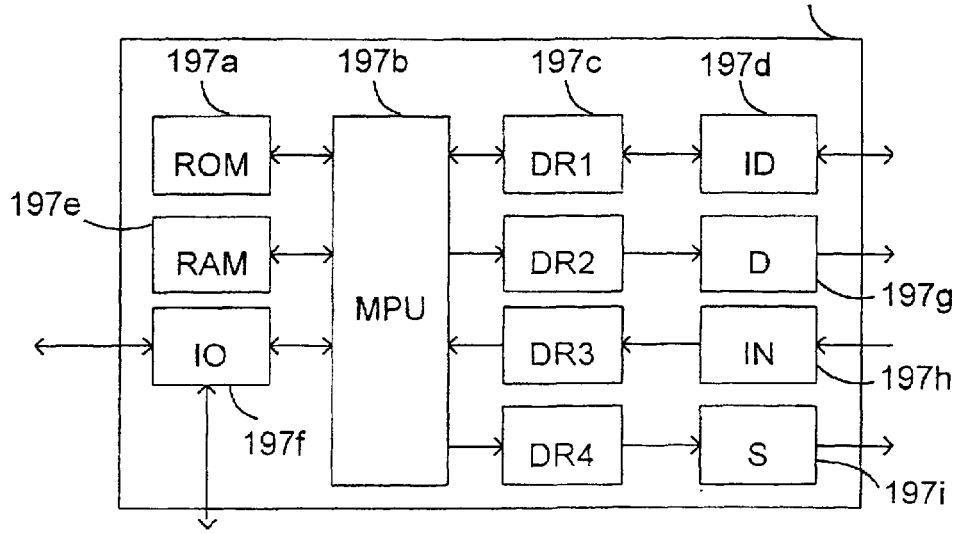
FIG. 3 shows an embodiment of an IPP block.

FIG. 3 shows in greater detail an embodiment of an IPP block 197. The IPP block 197 comprises a memory circuit 197a, processor 197b, four drivers 197c, identification means 197d, memory circuit 197e, input/output port 197f, display 197g, user interface 197h, and loudspeaker 197i. The memory circuit 197a is preferably a ROM circuit. The memory circuit 197e is preferably a RAM circuit. The identification means 197d, display 197g, user interface 197h, and loudspeaker 197i are each connected to the processor through their own drivers 197c.

The user interface 197h comprises a touch screen, mouse or push buttons, for instance. Through the user interface 197h, the user of the terminal equipment or phone inputs information and for instance commands to the equipment. The given commands allow the transfer of files, for instance, to the network and vice versa.

The processor 197b and the IPP block are connected through the input/output port 197f to a block 196 and 198. The identification means 197d is, in practice, a card reader which is connected to the processor through the driver 197c connected to the identification means 197d. The terminal equipment can read the information stored in the identification means. In addition, it is possible to store information into the identification means using the terminal equipment. The terminal equipment has a network address, fixed telephone number and mobile phone number, which are all stored in the identification means.

The IPP block 197 functions as terminal equipment for packet traffic and receives signals from the network. The terminal equipment can also transmit signals to the network. The user of the terminal equipment uses the signals to establish a connection to various service providers, for instance. Through the block 197, the service provider's services on the server become visible and audible to the user of the terminal equipment. Service information is displayed on the display 197g and audible through the loudspeaker 197i.

The information content in the identification means 197d defines, for instance, which packets the subscriber, i.e. user of the terminal equipment, is allowed to read or receive. The identification means can also define a service-specific user interface for the user, in which case the user interface is loaded through the network either to one memory only or to both memories 197a, 197e. The user gives commands to the terminal equipment and to the system through the user interface 197h. For instance, a telephone number displayed on the display 197g can be activated through the user interface 197h. In practice, activation means selecting the number for the block 198. Activating number selection may, however, require that the terminal equipment is in an appropriate operational mode.

Figure 4:
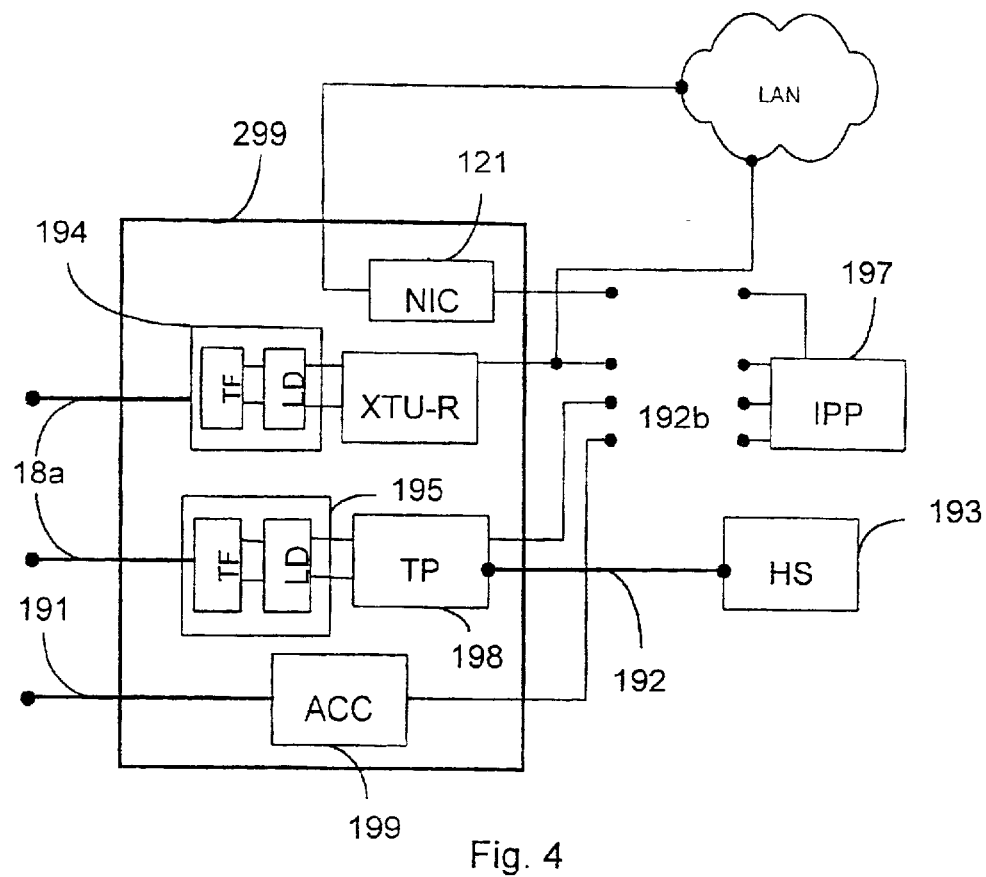
FIG. 4 shows an embodiment of the terminal equipment.

FIG. 4 shows an embodiment of the terminal equipment. To be more specific, the embodiment is a portable telephone which is able to establish a DSL connection.

In this embodiment, the terminal equipment comprises a frame part 299 which comprises a block 194, line transformer 194a, line driver 194b, block 195, line transformer 195a, line driver 195b, DSL block 196, IPP block 197, block 198, and power source 199.

In addition to the above-mentioned structural components, the terminal equipment comprises a handset 193, IPP block 197, and connection means 192b. A part of the connection means 192b is in the frame part 299 of the terminal equipment and another part is in the IPP block. The connection means 192b makes it possible to disconnect the IPP block 197 from the frame part 299 of the terminal equipment. The end of the connection means 192b which is on the frame part side can be implemented with a male connector, for instance. The end of the connection means 192b on the IPP block 197 side is then at its simplest implemented with a female connector.

The embodiment shown in FIG. 4 also comprises an adapting means 121 in the frame part 299. The adapting means 121 is connected to the connection means part 192b on the frame part side. In practice, the adapting means 121 is a network interface card or a corresponding means which enables connecting to a local area network, for instance. The adapting means 121 is located in the terminal equipment in such a manner that the IPP block, i.e. the docking part, can be used to connect the local area network, for instance a home network, through a DSL connection to a broadband network. If a local area network is used, the IPP block 197 connects through the local area network to other parts of the network. In this case, other network parts refer for instance to the parts of a telecommunications network, in which the desired service provider resides.

Figure 5:
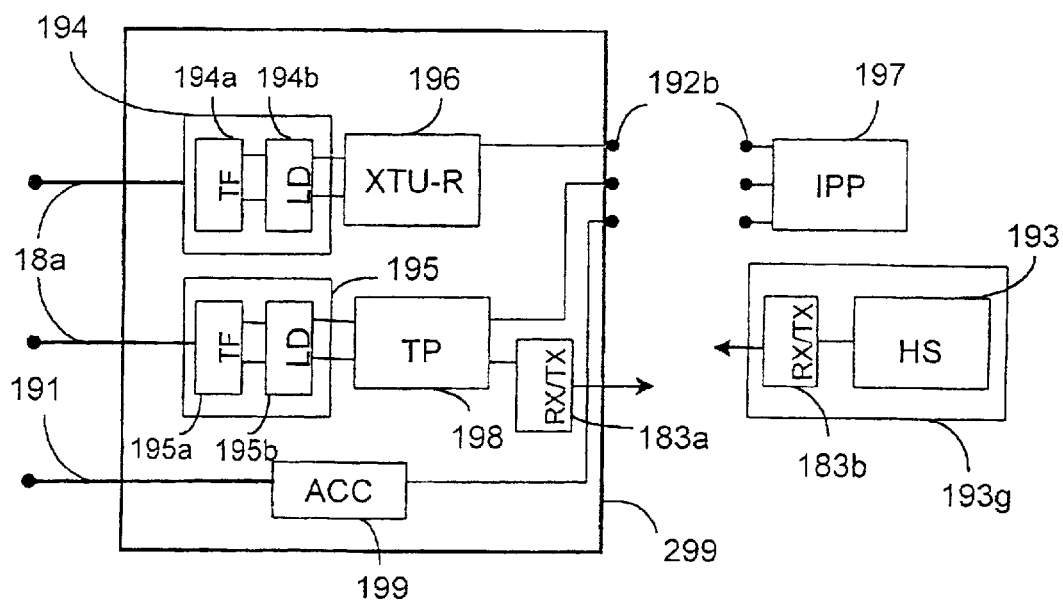
FIG. 5 shows an embodiment of the terminal equipment.

FIG. 5 shows an embodiment of the terminal equipment. To be more specific, the embodiment is a portable telephone having a wireless connection. The presented embodiment comprises a frame part 299 which comprises a block 194, line transformer 194a, line driver 194b, block 195, line transformer 195a, line driver 195b, DSL block 196, block 198, power source 199, and connection means 192b. The terminal equipment comprises an IPP block 197 and connection means 192b which is a counterpart for the connection means 192b in the frame part. The IPP block 197 can be disconnected from the frame part 299. If necessary, the IPP block can be docked to the frame part 299 for instance by pressing the connection means 192b together.

It is possible to load and store information, which has been received to the frame part in the xDSL format, in the IPP block, when the IPP block is docked to the frame part. After loading and storing the information, the IPP block can be disconnected from the frame part, and the user can read the information stored in the IPP block whenever suitable.

In addition, the terminal equipment comprises in the frame part a transceiver 183a which is connected to the block 198. The terminal equipment also comprises a handset part 193g which comprises the actual handset 193 and a transceiver 183b. The handset 193 and the transceiver 183b are connected to each other. In practice, the transceiver 183a is connected to an antenna, and a signal transmitted by the antenna is received by an antenna connected to the transceiver 183b. The antennas are, however, not shown in the figure.

FIG. 5 shows that the handset part 193g is not connected to the frame part 299 with a cable, for instance, but the connection is wireless. To be more specific, the transceivers 183a and 183b are connected wirelessly to each other. The wireless connection can be based on the transmission and reception of a radio signal or an infra-red signal, for instance. The transceivers 183a, 183b are arranged to generate and modulate a carrier. In addition, the transceivers 183a, 183b are arranged to demodulate a modulated carrier. A wireless connection between the transceivers 183a, 183b makes it possible to locate the frame part 299 and the handset part 193g relatively far away from each other.

The transceivers 183a, 183b transmit to each other a modulated signal which comprises speech. The speech signal first propagates by a cable 18a to the line transformer 195a, from which it is transmitted through the line driver 195b to the block 198. After this, the signal is transmitted to the transceiver 183a which modulates the speech signal, after which the modulated signal is transmitted to the transceiver 183b in the handset 193, and the received signal is demodulated. The user of the handset can hear the sound waves corresponding to the demodulated signal in the earpiece. In principle, the transmission direction of the handset works in the same manner as the reception direction.

Figure 6:
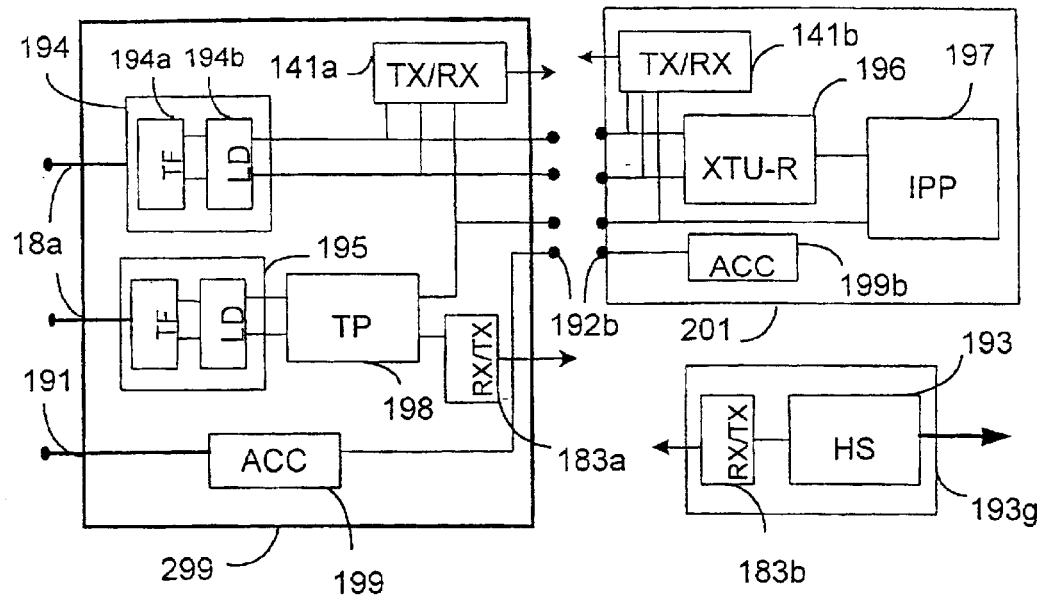
FIG. 6 shows an embodiment of the terminal equipment.

FIG. 6 shows an embodiment of the terminal equipment. To be more specific, the embodiment is a wireless phone having a wireless xDSL connection. The presented embodiment comprises a frame part 299 which comprises a block 194, line transformer 194a, line driver 194b, block 195, line transformer 195a, line driver 195b, block 198, power source 199 and connection means 192b.

In addition, the embodiment shown in FIG. 6 comprises in the frame part a transceiver 141a which is connected to the line driver 194b and block 198. The embodiment also comprises a structure 201 which can be disconnected from the frame part. The structure 201 comprises a part of the connection means 192b as described earlier. The structure 201 can be disconnected from the frame part at the connection formed by the connection means 192b. The structure 201 can also be docked to the frame part.

The structure 201 also comprises a transceiver 141b, DSL block 196, IPP block 197 and power source 199b which is implemented by an accumulator or a battery, for instance. The transceiver 141b in the structure 201 is connected to the DSL block 196 and IPP block. The IPP block is further connected to the DSL block. The transceivers 141a and 141b have a wireless connection to each other. In practice, the transceiver 141a is connected to an antenna, and a signal transmitted by the antenna is received by an antenna connected to the transceiver 141b.

The wireless connection between the transceivers 141a and 141b can be based on the transmission and reception of a radio signal or an infra-red signal, for instance. The wireless connection between said transceivers 141a, 141b makes it possible to locate the frame part 299 and the part 201 relatively far away from each other. The transceivers 141a, 141b are arranged to establish a wireless xDSL connection to each other.

The frame part receives a broadband xDSL signal coming to the frame part by a cable 18a. The received signal is transmitted through the line transformer 194a and line driver 194b to the transceiver 141a. The transceiver 141a modulates the xDSL signal which is after the modulation transmitted to the transceiver 141b which demodulates the received signal. The demodulated xDSL signal is transmitted to the DSL block 196 which removes the xDSL format of the xDSL signal. The information in the xDSL signal is displayed on a display in the IPP block. If the xDSL signal comprises music, for instance, the music can be heard through a loudspeaker 197i.

In principle, the handset functions in the transmission direction in the same manner as in the reception direction. In other words, the user can give commands through the user interface in the IPP block. The given commands are transformed into the xDSL format in the block 196. After this, the xDSL-format signal is modulated in the transceiver 141b, and the modulated signal is transmitted over the radio path to the transceiver 141a. The transceiver 141a demodulates the signal received over the radio path and transmits it through the line driver 194b and line transformer 194a to the transmission path 18a, from which the signal continues to a server, for instance. The transceiver pairs 141a, 141b and 183a, 183b preferably operate on different frequencies so they can also operate simultaneously.

The embodiment shown in FIG. 6 also comprises a handset part 193g which comprises the actual handset 193 and a transceiver 183b. The transceiver 183b and the transceiver 193a in the frame part establish a connection to each other over the air path. The handset functions like the handset described in FIG. 5.

Figure 7:
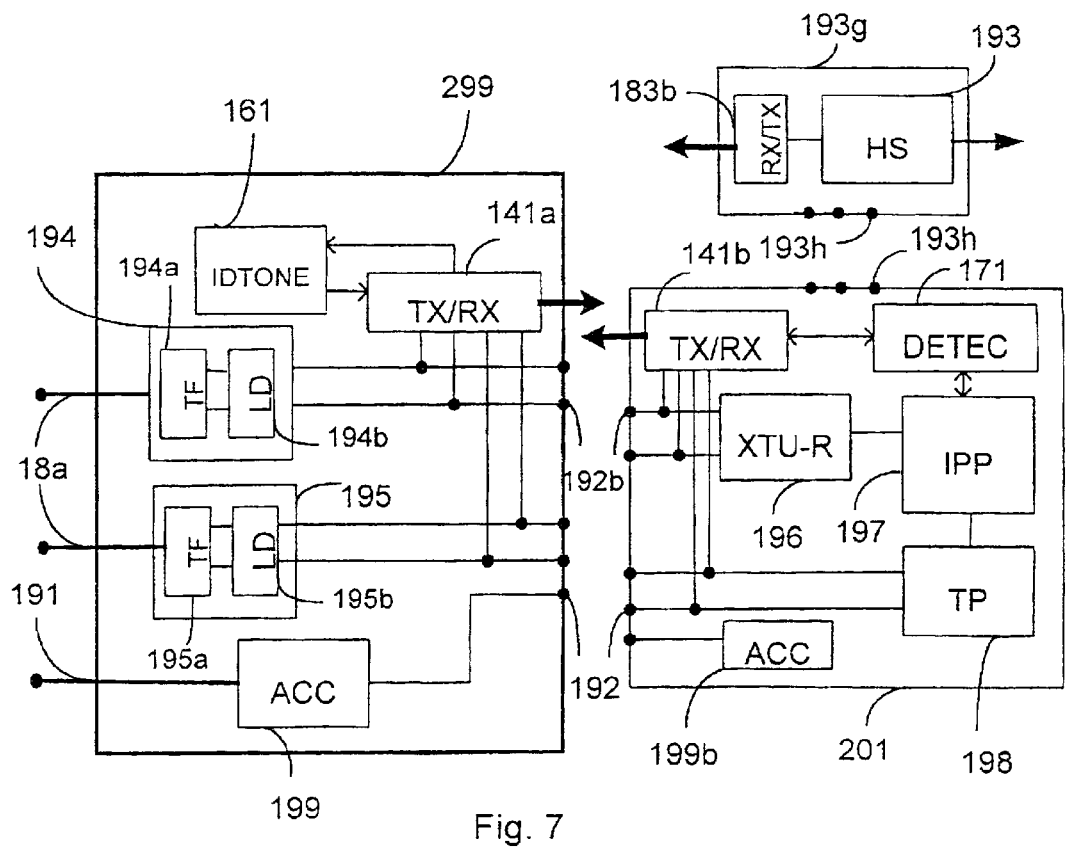
FIG. 7 shows an embodiment of the terminal equipment.

FIG. 7 shows an embodiment of the terminal equipment. To be more specific, the embodiment is a mobile phone having a wireless xDSL connection.

The presented embodiment comprises a frame part 299 which comprises a transceiver 141a, block 194, line transformer 194a, line driver 194b, block 195, line transformer 195a, line driver 195b, power source 199 and connection means 192b. The frame part also comprises a generator 161 which is connected to a transceiver 141a. The generator 161 is arranged to transmit an identification signal to identify the frame part transmitting the signal and acting as a kind of base station.

In addition, the embodiment shown in FIG. 7 comprises a handset part 193g which comprises the actual handset 193 and a transceiver 183b. The handset 193 and transceiver 183b of the handset part 193g function as described earlier. The handset part 193g also comprises a connection means 193h. A signal transmitted by the generator 161 comprises information on whether the frame part already is reserved for the use of the handset part 193g.

In addition, the embodiment comprises a structure 201 which can be disconnected from the frame part. The structure 201 comprises a connection means 192b together with the frame part. The structure 201 can be disconnected from the frame part at the connection formed by the connection means 192b. The structure 201 can be docked to the frame part by means of the connection 192b.

In addition, the structure 201 comprises together with the frame part a connection means 192 which, in practice, is two connectors. The structure 201 can be disconnected from the frame part at the connection formed by the connection means 192. The structure 201 can be docked to the frame part by means of the connection 192.

The structure 201 comprises a connection means 193h together with the handset part 193g. The handset part 193g can be disconnected from the structure 201 at the connection formed by the connection means 193. The handset 193g can be docked to the frame part by means of the structure 201.

In addition, the structure 201 comprises a transceiver 141b, DLS block 196, IPP block 197, block 198 and power source 196b which is implemented by an accumulator or a battery, for instance. The structure 201 can also act as a conventional wireless telephone, because the structure 201 comprises the block 198.

In addition, the structure 201 comprises a detector 171 which is connected to the transceiver 141b and IPP block 197. The detector 171 is arranged to receive a signal from the generator in the frame part. The detector 171 detects from the signal transmitted by the generator whether the frame part is ready and free from other users to start connection establishment.

The transceiver 141b is connected to the block 198 and DSL block 196 which is further connected to the IPP block 197. The IPP block is connected to the DSL block 196. The transceiver 141a in the frame part and the transceiver 141b in the structure 201 are arranged to establish a wireless DSL connection to each other. The transceivers 141a and 141b can transmit to each other a broadband signal, for instance.

The signal to be transmitted is modulated before transmission to the radio path. The transceivers 141a, 141b are arranged to form a carrier and to modulate it with an information signal before transmitting the modulated signal to the air path. In addition, the transceivers 141a, 141b are arranged to demodulate a modulated carrier. The transceiver 183b in the handset part 193g and the transceiver 141a are arranged to establish a connection to each other through a modulated xDSL signal.

The transceiver 141b receives from the DSL block 196 a signal in xDSL format, which is used to modulate the carrier formed by the transceiver 141b. The transceiver 141b transmits the modulated carrier over the air path to the transceiver 141a which demodulates the received signal. The xDSL signal resulting from the demodulation is transmitted by the cable 18a to the network.

The frame part receives from the network the xDSL signal which arrives by the cable 18a to the frame part, from which it is transmitted to the transceiver 141a. The transceiver 141a modulates a carrier with the received xDSL signal, and after modulation, the carrier is transmitted to the transceiver 141b over the air path. The transceiver 141b demodulates the received signal. The xDSL format is removed from the demodulated signal in the DSL block 196.

The terminal equipment structure of the invention, which comprises the frame part, thus comprises an xDSL modem structure divided into two parts. Dividing the modem structure into several parts makes it possible to form an air interface between the parts. An RF signal is transmitted on several channels between the different parts.

With reference to FIG. 7, the xDSL signal transmitted to the air path is formed in the frame part. To be more specific, the xDSL signal to be transmitted is formed by means of the block 194, generator 161 and transceiver 141a. The above-mentioned blocks of the frame part form an NRW (non-regenerative wireless) modem whose structure and operation differ from prior art transponder structures, for instance.

The NRW modem in the frame part does not regenerate the symbol of the xDSL signal when the signal is transmitted to the air path. This means that for instance a DMT (discrete multi-tone) symbol of an ADSL signal is not regenerated in said situation.

The generator 161 divides the signal to be transmitted by telephone cable into physically and galvanically separate uplink and downlink signals. Signals on different RF channels are used in signal transfer from the NRW modem of the frame part to the user's terminal equipment and from the user's terminal equipment to the NRW modem of the frame part. The RF channels are selected so that they are at a sufficient distance from each other in the frequency domain. Voice-frequency signals which contain speech can also be forwarded to an RF interface.

Channels modulated to different carrier frequencies are set up for a connection between the frame part and the structure 201 of the user. The downlink signal transmitted by the transceiver 141a and received by the transceiver 141b in the structure 201 of the user, is modulated to a carrier. The structure 201 modulates the uplink signal to be transmitted to the frame part to another carrier whose frequency differs from that of the carrier transmitted in the downlink direction. For a third frequency, a narrowband signal is modulated, which forms a bi-directional control channel whose transmission rate is relatively low. Information is transmitted in the control channel established between the frame part and the structure 201 during connection establishment, for instance. A fourth carrier can be formed for a voice-frequency voice signal, for instance. The voice signal can be transmitted over the control channel, for instance, thus avoiding the formation of the fourth carrier.

Figure 8:
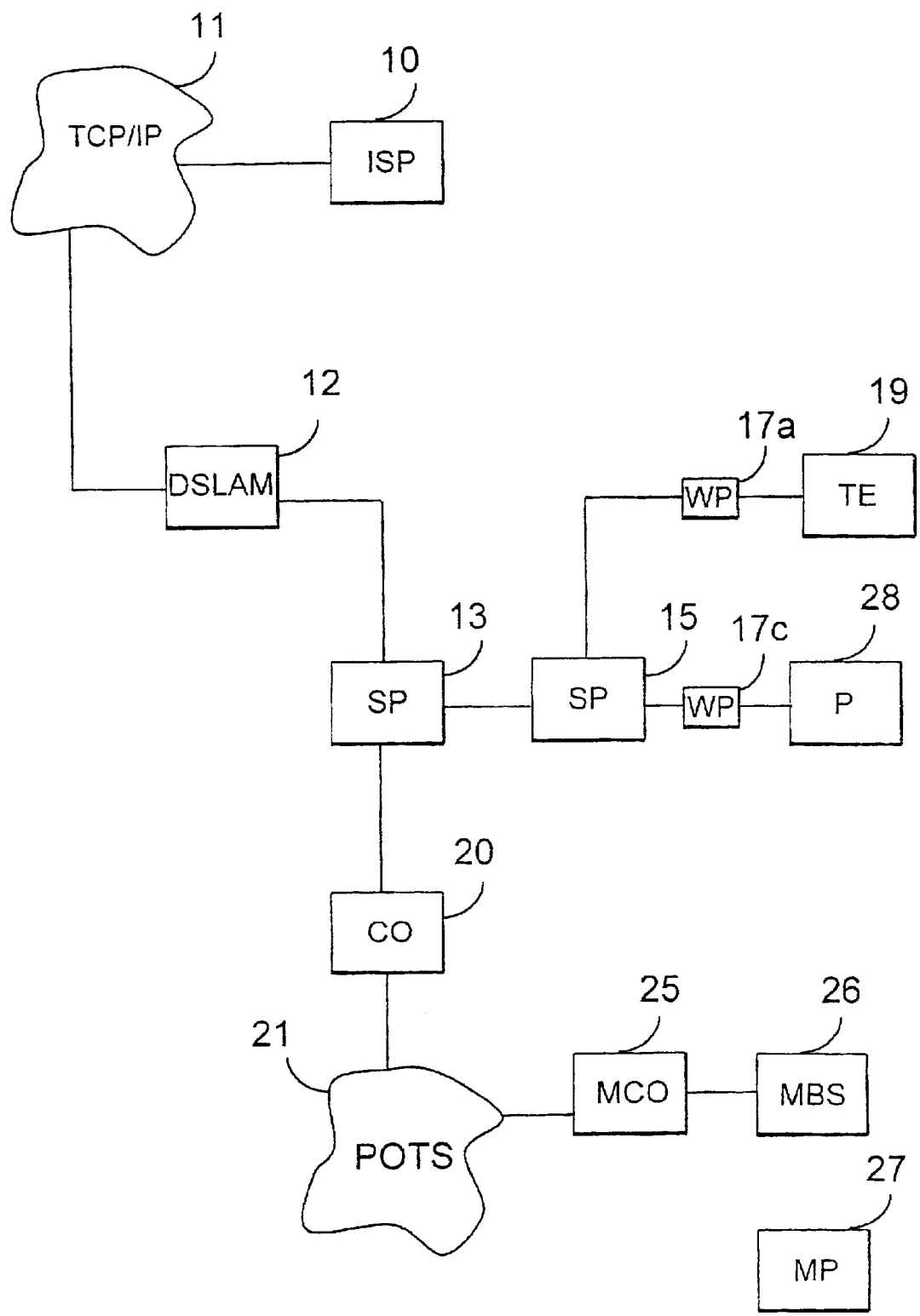
FIG. 8 shows an embodiment of the operating environment of the terminal equipment.

FIG. 8 shows an embodiment of the operating environment of the terminal equipment 19. The operating environment is, in practice, a data transmission system which comprises a server 10, TCP/IP (transmission control protocol/Internet protocol) network 11, multiplexer 12, filters 13, 15, cable 14 between the filters 13, 15, DSL plug 17a, telephone plug 17c, telephone network 21, mobile switching center 25, mobile system base station 26, mobile telephone 27, conventional telephone 28 and telephone exchange 29.

The presented operating environment is a data transmission system which also comprises terminal equipment 19 comprising land line telephone and mobile telephone properties, for instance. The terminal equipment 19 is arranged to transmit and receive an xDSL signal.

In the embodiment shown in FIG. 8, the terminal equipment 19 is connected to plugs 17a, 17c which are further connected to the filter 15. The filter 15 is connected to the filter 13 through the cable 14. The filter 13 is connected to both the multiplexer 12 and to the telephone exchange 29. The multiplexer 12 is connected to the TCP/IP network 11, to which the server 10 is also connected. The telephone exchange 29 is connected to the telephone network 21, to which the mobile switching center 25 is also connected. The base station 26 is connected to the telephone exchange 29 through the mobile switching center and the telephone network.

The server 10 is more specifically an ISP (Internet service provider) server which provides different services to the user of the terminal equipment. The server is implemented by a computer, for instance. The TCP/IP network 11 refers to a data transmission network employing a TCP/IP data transmission protocol. In other words, the network 11 is an Internet network, for instance.

The multiplexer 12, i.e. DSLAM (digital subscriber line access multiplexer) is usually a multiplexer/concentrator installed in a telephone exchange, by means of which the individual cables 14 to the subscriber, i.e. the user of the terminal equipment, are concentrated into one network point. The cables are twisted-pair copper cables, for instance.

The filter 13 is a splitter filter which does high-pass and low-pass filtering. The filter 13 is preferably located in the telephone exchange 29. The filter 15 can be similar in structure and operation to the filter 13. The filter 15 is preferably located in the premises of the subscriber. The filter 13 which is in the telephone exchange or connected to it is arranged to separate the voice-frequency signal and the broadband signal from the xDSL signal transmitted by the twisted pair cable.

The plugs 17a, 17c are, in practice, fastened to a wall of an apartment. FIG. 8 shows that the plugs 17a, 17c are connected to the filter 15. A broadband signal is transmitted to the terminal equipment through the DSL plug 17a. Said broadband signal is preferably a packet-switched signal. Conventional telephone traffic comprising an analogue signal is transmitted to the telephone 28 through the telephone plug 17c. Said analogue signal is a signal passed through the filter 15.

Figure 9:
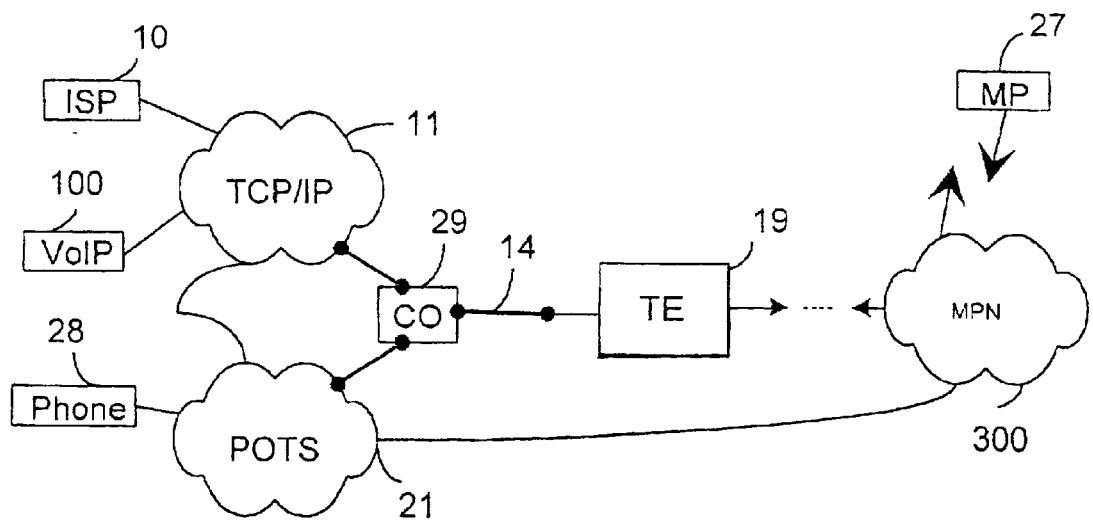
FIG. 9 shows an embodiment of the operating environment of the terminal equipment.

FIG. 9 shows as a network-level description an embodiment of a data transmission system which comprises terminal equipment 19 which is a DSL telephone. The data transmissions system comprises servers 10, a TCP/IP network 11, cable 14, telephone network 21, mobile telephone 27, conventional land line telephone 28 and mobile network 300.

The telephone network shown in FIG. 9 is preferably a switched telephone network. The TCP/IP network is preferably a packet-switched Internet network. The cable 14 is preferably a twisted-pair copper cable.

In the embodiment of FIG. 9, the servers 10 are connected to the TCP/IP network. The land line telephone 28 is preferably permanently connected to the telephone network 21. The TCP/IP network and the telephone network are connected to the telephone exchange 29 and onward through the transmission path 14 to the terminal equipment 19. The terminal equipment 19 can connect through the radio path to the mobile network 300. The servers are preferably VoIP (Voice over Internet protocol) servers.

In the embodiment of FIG. 9, the terminal equipment acting as a telephone can establish an xDSL connection to the server 10, for instance. The terminal equipment 19 can set up a voice channel for establishing a connection to the land line telephone 28. The voice channel signal is transmitted part of the way in the xDSL signal. The terminal equipment 19 can also be connected to the mobile telephone 27. The terminal equipment can simultaneously be connected to the server and the land line telephone 28 or mobile telephone 27, for instance.

Figure 10:
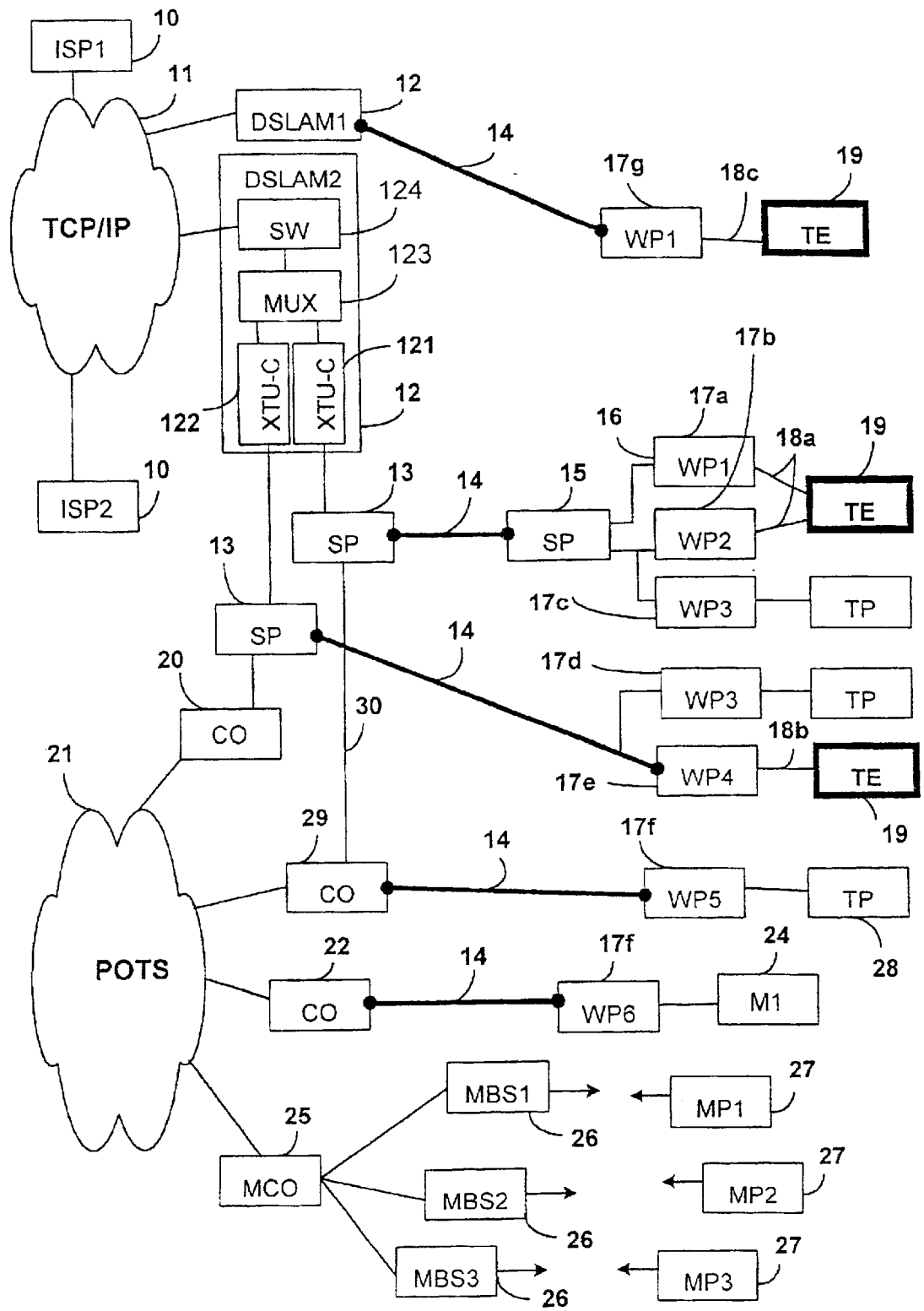
FIG. 10 shows in greater detail an embodiment of the operating environment of the terminal equipment.

FIG. 10 shows in greater detail the embodiment of a data transmission system. The data transmission system comprises servers 10, a TCP/IP network 11 and multiplexers 12. Both multiplexers 12 comprise a transceiver unit 121, multiplexer 123 and router 124.

In addition, the data transmission system comprises filters 13, a filter 15, cables 14, a wire 16, DSL plug 17a, telephone plug 17b, telephone plug 17c, telephone plug 17d, telephone plug 17e, telephone plug 17f, telephone plug 17g, cables 18a, a cable 18b, cable 18c, terminal equipment 19, telephone exchanges 20, 22, 29, a switched telephone network 21, modem 24, mobile switching center 25, base stations 26 of a mobile system, mobile telephones 27 and a group of conventional land line telephones 28.

The server 10 is for instance a computer providing different Internet services. The transceiver unit 121 is an ADSL, HDSL or VDSL modem, for instance. The transceiver unit 121 generates a broadband xDSL signal which is transmitted to the terminal equipment. The transceiver unit 121 also disassembles the broadband xDSL signal which arrives from the terminal equipment to the transceiver unit 121. The modem can be marked as ATU-C, HTU-C and VTU-C depending on the type. The multiplexer 123 is arranged to concentrate the individual twisted pair cables going to the subscriber into one network point.

Thus, the transceiver unit 121 is in this solution an essential part of the Internet network. The frame part forms a coverage area and transmits the address of the transceiver unit 121 to the terminal equipment in the area. The data transmission system comprises a control channel, on which said address is transmitted. The control channel and the transmitted information make it possible that the terminals need not be fixed to operate, but they can also be mobile.

The transceiver unit 121 shown in FIG. 10 is an xDSL modem which resides in a multiplexer 12 in a telephone exchange, for instance. The transceiver unit 121, i.e. xDSL modem, has an Internet address which is stored in the frame part acting as an NRW modem and connected to the telephone plug of the subscriber of the service. The Internet address is stored in the generator 161, for instance.

The frame part is in idle mode when no signal is transmitted from it to the equipment of the user. The transmitters of all channels are then switched off. However, the receiver which receives signals from the control channel is switched on and is able to receive a signal from the control channel.

The frame part forms a coverage area, and terminal equipment arriving at the area transmits an invoke signal at predefined control channel frequencies. The frame part which is in idle mode receives the invoke signal and transmits an identification signal which contains information on the Internet address stored in the generator 161. The frame part transmits the identification signal during a predefined time or until the terminal equipment replies to it and reserves a channel for its use. Synchronization information, for instance, to control the transmission of the actual traffic can also be transmitted on the control channel.

The user can give different commands by means of the terminal equipment. Using the commands, the user can make different interrogations to and searches from the server. The router 124 routes the commands given by the user of the terminal equipment to the server which on the basis of the received commands can return the results to the user.

The telephone plug 17c is for a parallel phone. An analogue signal on a voice-frequency band and filtered by the filter 15 is brought to the telephone plug 17c. The filter 15 is preferably located in the premises of the subscriber or in its immediate vicinity. The telephone plug 17d is a conventional telephone plug to which a signal, which has not been filtered by the filter 15 at the subscriber end, is brought for a conventional telephone.

The telephone plug 17e is also a conventional parallel telephone plug, to which a DSL telephone 19 is connected without a filter 15. The telephone plug 17f is a conventional telephone plug, through which the conventional land line telephone 28 is connected to the telephone exchange 29 without any filtering. The telephone plug 17f is a DSL plug, through which the terminal equipment 19 is connected directly to the multiplexer 12. Direct connection refers to the fact that no splitter filters are used on the data transmission path between the terminal equipment 19 and multiplexer 12.

A packet-switched transmission link can be established to the terminal equipment 19 from the server 10 for instance as follows. Data is transmitted from the server 10 through the network 11 to the multiplexer 12, from which the data is further transmitted to the filter 13. After this, the signal is transmitted by the cable 14 to the filter 15, from which the data is transmitted by the wire 16 to the DSL plug 17a. From the DSL plug 17a, the data is transmitted by the cable 18a to the terminal equipment 19. Simultaneously with the above-mentioned link, the terminal equipment 19 can have a switched connection from the voice-frequency interface of the modem 24, for instance. This connection can be established along the following route: 24, 17f, 14, 22, 21, 29, 13, 14, 15, 17b, 18a and 19.

Figure 11A:
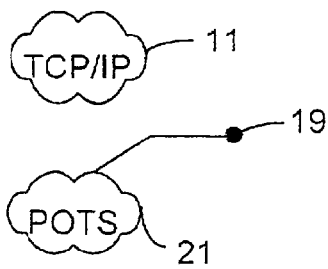
FIG. 11a shows a first embodiment of connecting the terminal equipment to a data transmission network.

FIG. 11a shows an embodiment for connecting the terminal equipment 19 to a data transmission network comprising a telephone network 11 and TCP/IP network 21. In the embodiment, the terminal equipment is connected directly to the telephone network from the premises of the subscriber.

Figure 11B:
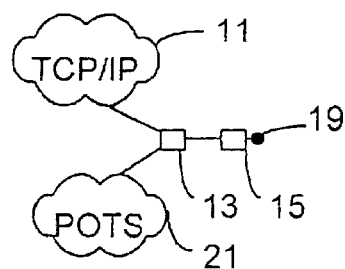
FIG. 11b shows a second embodiment of connecting the terminal equipment to a data transmission network.

In the embodiment of FIG. 11b, the data transmission network comprises a telephone network and a TCP/IP network. In addition, the data transmission network comprises two splitter filters 13, 15 and terminal equipment. The terminal equipment is connected from the premises of the subscriber through both filters 13, 15 to the telephone network and the TCP/IP network.

Figure 11C:
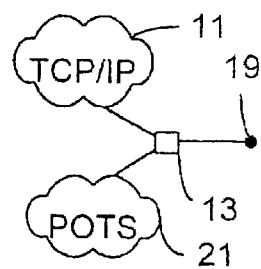
FIG. 11c shows a third embodiment of connecting the terminal equipment to a data transmission network.

In the embodiment of FIG. 11c, the data transmission network comprises a telephone network, TCP/IP network and filter 13. The terminal equipment is connected from the premises of the subscriber through the filter 13 to the telephone network and the TCP/IP network.

Figure 11D:
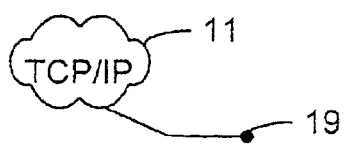
FIG. 11d shows a fourth embodiment of connecting the terminal equipment to a data transmission network.

In the embodiment of FIG. 11d, the data transmission network comprises a telephone network and a TCP/IP network. In this embodiment, the terminal equipment is connected directly from the premises of the subscriber to the TCP/IP network.

Figure 11E:
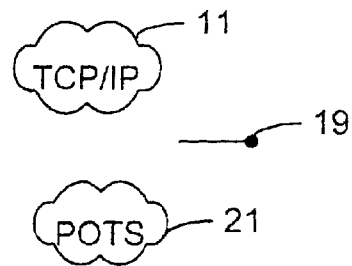
FIG. 11e shows a fifth embodiment of connecting the terminal equipment to a data transmission network.

In the embodiment of FIG. 11e, the data transmission network comprises a telephone network and a TCP/IP network. In this embodiment, the terminal equipment is not connected to either of the networks.

Figure 12:
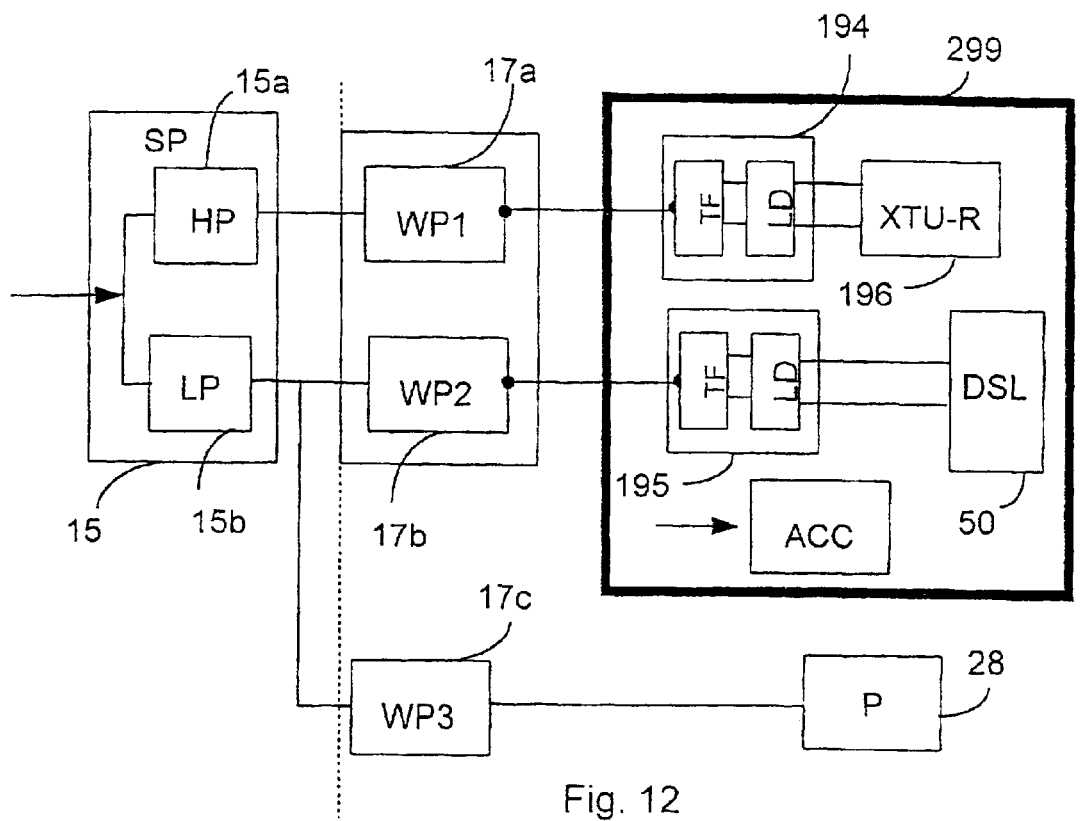
FIG. 12 shows a first embodiment of connecting the terminal equipment to a plug.

FIG. 12 shows an embodiment for connecting the terminal equipment 19 to a plug and on to a filter 15. In addition, the figure shows the connection of a conventional land line telephone 28 to the filter 15. The filter 15 comprises a high-pass filter 15a and a low-pass filter 15b.

FIG. 12 shows that the high-pass filter 15a is connected through a DSL plug 17a to a line transformer 194a of the terminal equipment, and the line transformer is further connected through a line driver 194b to a DSL block 196. The terminal equipment comprises a DLS telephone block 50 which comprises the blocks of the telephone blocks described earlier that are at each time required for the implementation of different DSL telephone types. The DSL block 196 is connected to said DSL telephone block 50.

The figure also shows that the low-pass filter 15b is connected through a plug 17b to a line transformer 195a of the terminal equipment 19, and the line transformer is further connected through a line driver 195b to the DSL telephone block 50.

FIG. 12 further shows that a telephone plug 17c is connected to the output of the low-pass filter 15b. A conventional land line telephone 28 is connected to the telephone plug 17c.

In the embodiment of FIG. 12, the DSL telephone 19 is connected to the network through two wall plugs. Broadband packet traffic comes through the plug 17a and voice-frequency calls come through the plug 17b. In the case in question, the parallel telephones 28 in the premises can be used even though the DSL modem was a full-speed ADSL modem, for instance. This wall connection alternative is the most preferable of the possible DSL telephone connection structures.

Figure 13:
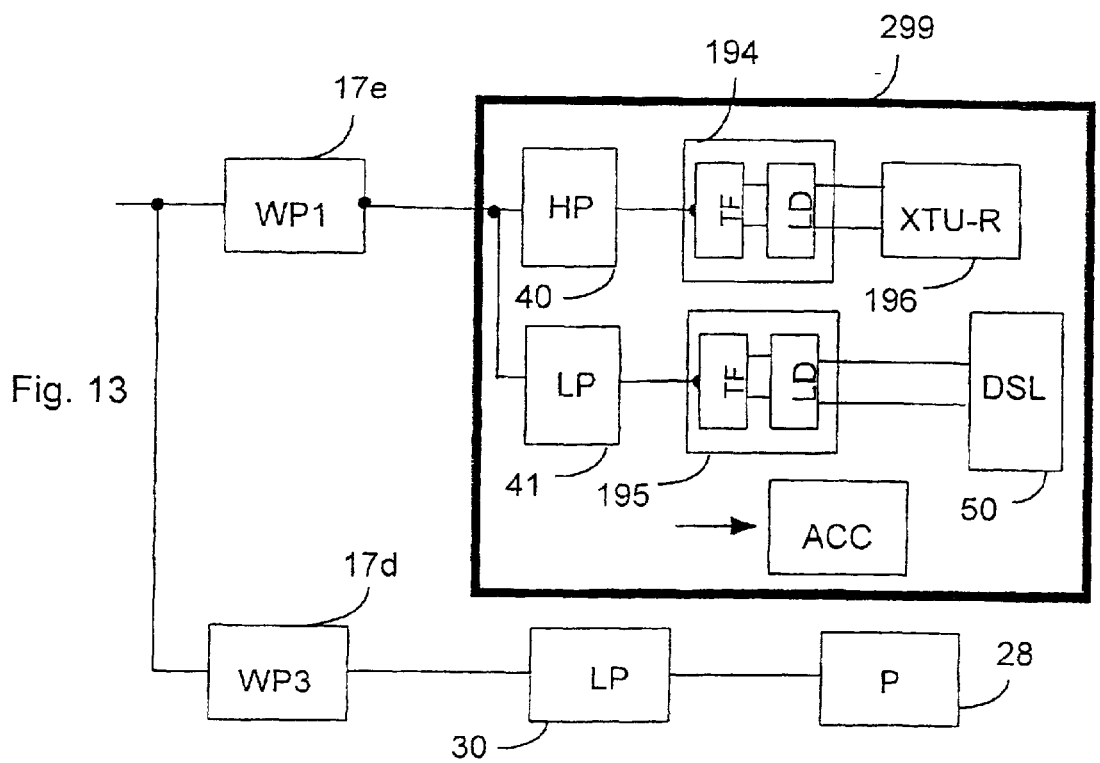
FIG. 13 shows a first embodiment of connecting the terminal equipment 19 to a plug.

FIG. 13 shows an embodiment for connecting the terminal equipment 19 through a plug to the network. The connection has been made without separate splitter filters in the premises of the subscriber, such as shown in the embodiment of FIG. 12. FIG. 13 shows that the connection comprises two plugs 17e, 17d which are connected to a cable 14.

The connection comprises a conventional land line telephone 28 and a low-pass filter 30, through which the land line phone 28 is connected to the plug 17d. The low-pass filter 30 only allows a voice-frequency band signal to the telephone 28.

The terminal equipment comprises a high-pass filter 40 and a low-pass filter 41. The plug 17e is connected to both filters 40, 41. The filter 40 is connected through a line transformer 194a, line driver 194b and DSL block 196 to a DSL telephone block 50. The filter 40 only allows a broadband signal to the line transformer 194a. The filter 41 is connected through a line transformer 195a and line driver 195b to a DSL telephone block 50. The filter 41 only allows a voice-frequency band signal to the line transformer 195a.

In this embodiment, the splitter filters are thus in the actual terminal equipment 19. In addition, there is a splitter filter between the conventional land line telephone 28 and the plug 17d. The land line telephone 28 acts in this situation as a parallel telephone to the terminal equipment 19.

Figure 14:
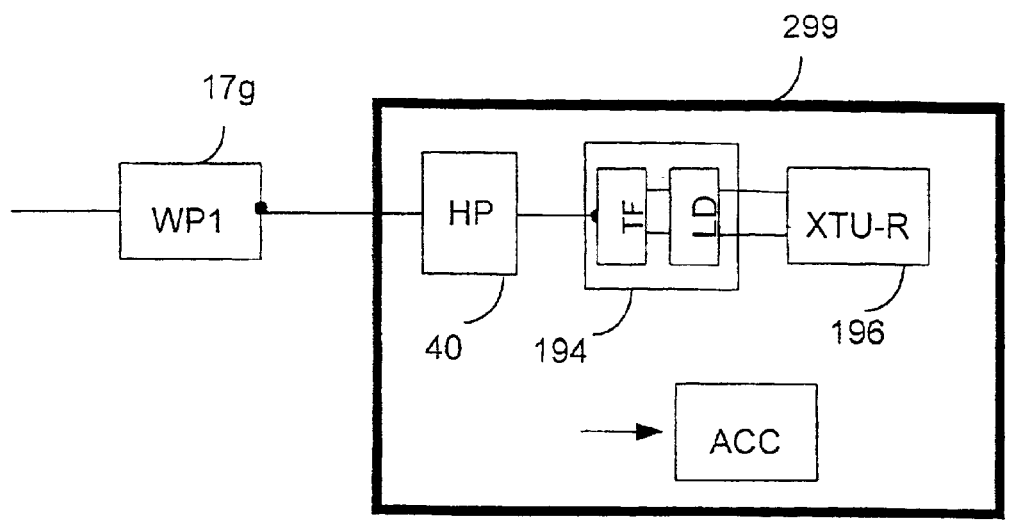
FIG. 14 shows a first embodiment of connecting the terminal equipment 19 to a plug.

FIG. 14 shows an embodiment for connecting the terminal equipment 19 to the network. The terminal equipment comprises a high-pass filter 40 which is connected through a line transformer 194a, line driver 194b and DSL block 196 to a DSL telephone block 50. The line transformer of the terminal equipment is connected to a cable 14 through a plug 17g. The filter 40 only allows a broadband signal to the line transformer 194a. The terminal equipment shown in FIG. 14 can only be used in transmitting and receiving a broadband signal.

Figure 15:
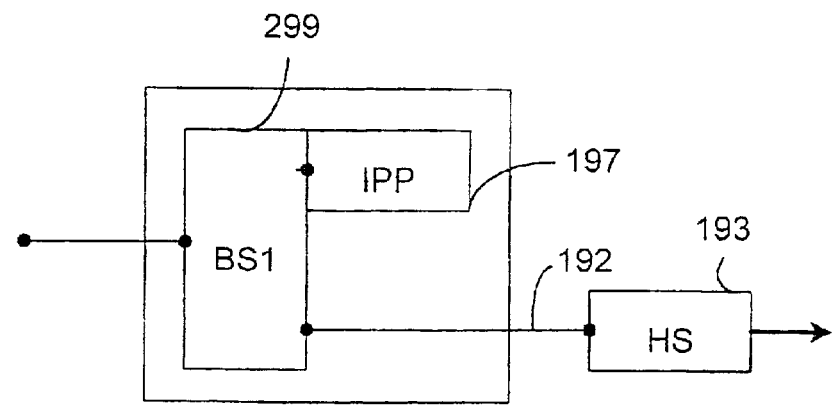
FIG. 15 shows a first structure of the terminal equipment.

FIG. 15 shows a structural alternative of the terminal equipment 19. The terminal equipment 19 comprises a frame part 299, IPP block 197 and handset 198 which is connected by a cable 192 to the frame part. The presented terminal equipment 19, which is a fixed DSL telephone, is connected through a wire 80 to a telephone plug 17.

Figure 16:
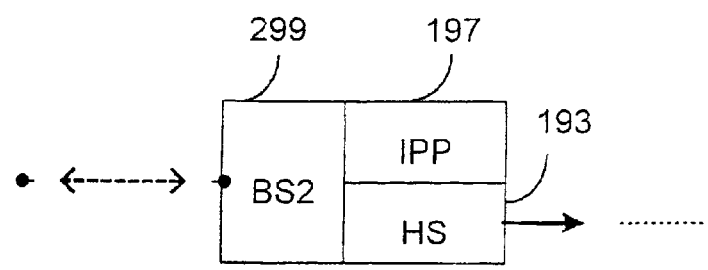
FIG. 16 shows a second structure of the terminal equipment.

FIG. 16 shows a structural alternative of the terminal equipment 19. The terminal equipment comprises within the same mechanics a frame part 299, IPP block 197 and handset 193. The presented terminal equipment 19, which also functions as a conventional mobile phone, also comprises means for establishing a DSL connection. The terminal equipment 19 is connected to a telephone network through a cable, for instance.

Figure 17:
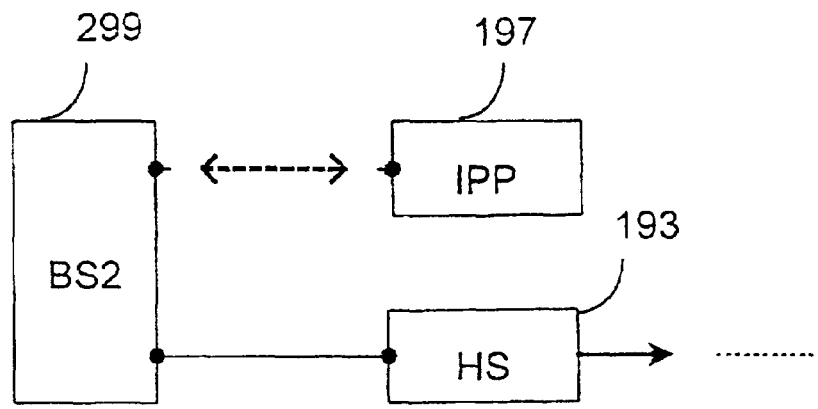
FIG. 17 shows a third structure of the terminal equipment.

FIG. 17 shows a structural alternative of the terminal equipment 19. The terminal equipment 19 comprises a frame part 299, IPP block 197 and handset 193 which is connected by a cable 192 to the frame part. The IPP block 197 which comprises a display, for instance, can be disconnected from the frame part. The user can thus carry the IPP block 197 of the terminal equipment 19 along.

Figure 18:
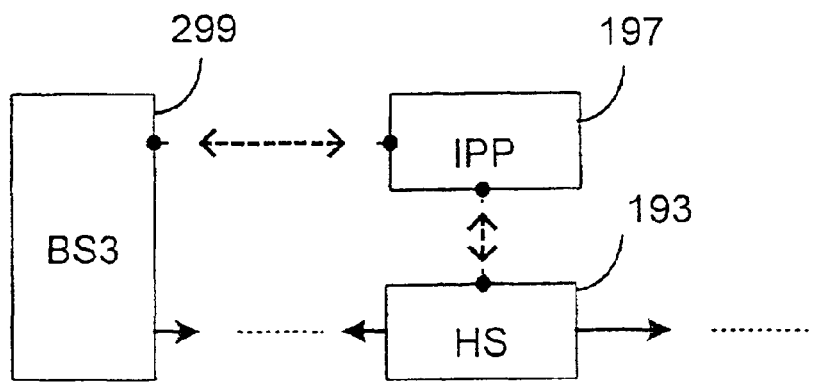
FIG. 18 shows a fourth structure of the terminal equipment.

FIG. 18 shows a structural alternative of the terminal equipment 19. The terminal equipment 19 comprises a frame part 299, IPP block 197 and handset 193. The IPP block and handset can be disconnected from the frame part. Data transmission between the frame part and handset is wireless. Data transmission between the IPP block and frame part is also wireless. In this structural alternative, the IPP block can be docked to the frame part. In addition, the handset can be docked to the IPP block. This terminal equipment structure is a portable DSL telephone employing wireless data transmission.

Figure 19:
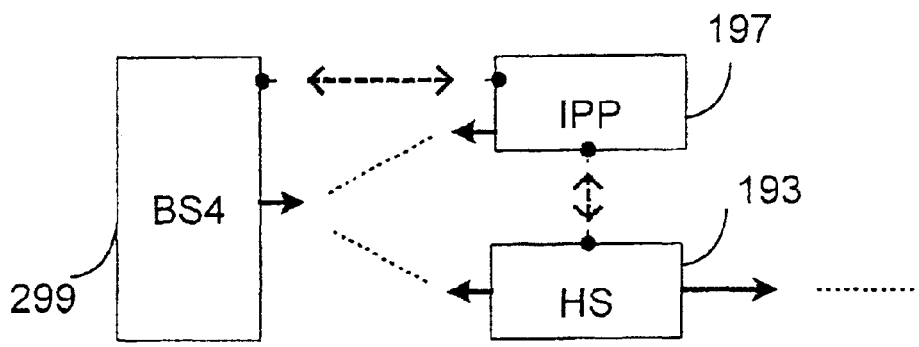
FIG. 19 shows a fifth structure of the terminal equipment.

FIG. 19 shows a structural alternative of the terminal equipment 19. The terminal equipment 19 comprises a frame part 299, IPP block 197 and handset 193. The terminal equipment 19 shown in FIG. 19 is a mobile DSL telephone. A mobile DSL telephone refers to an arrangement, in which the IPP block and handset form an entity which can be moved within a coverage area created by one telephone plug and the frame part acting as a transceiver. The user of the terminal equipment can thus carry the IPP block 197 or handset 193 along.

Figure 20:
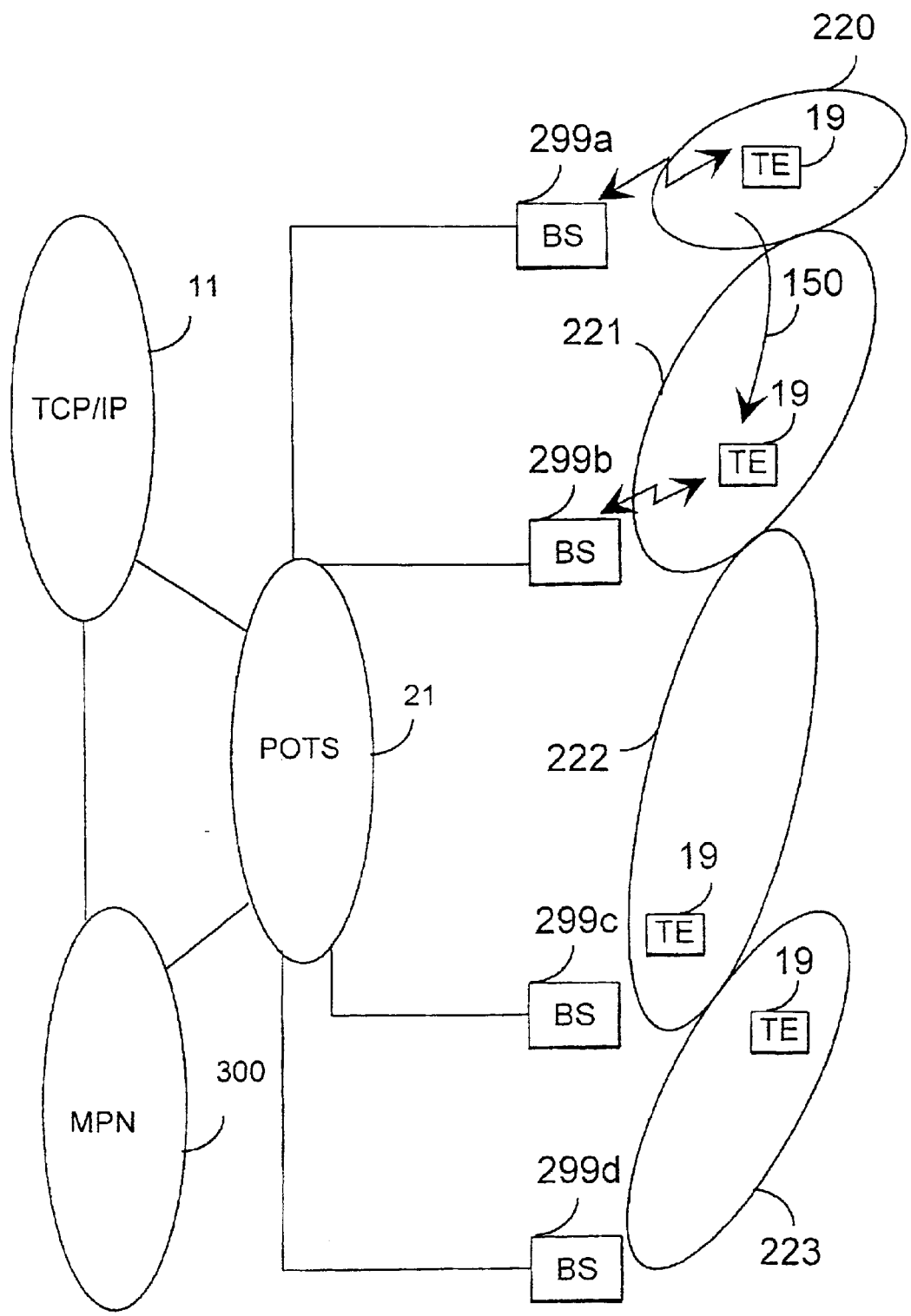
FIG. 20 shows an embodiment of a data transmission system comprising terminal equipment.

FIG. 20 shows an embodiment of a data transmission system comprising the terminal equipment presented above. The frame part of each terminal equipment is connected through a different telephone plug to the network. The frame part and the telephone plug act as a kind of base station which forms its own coverage area.

The data transmission system comprises a packet-switched network 11, public telephone network 21 and mobile network 300. A telecommunications connection can be established to said three networks by means of the terminal equipment 19. The connections to said networks can be simultaneous. The base station can be considered a first transceiver which is connected to a second transceiver which is a structural part 201 of terminal equipment carried by the user. A handset 193g forms a third transceiver.

FIG. 20 shows that a frame part 299a forms a coverage area 220, a frame part 299b forms a coverage area 221, a frame part 299c forms a coverage area 222 and a frame part 299d forms a coverage area 223. The coverage areas may, in practice, overlap somewhat. If the terminal equipment 19 is in one of the coverage areas, the terminal equipment can establish a connection to the frame part 299, from which the signal establishing the connection is transmitted on to the desired location. A modulated xDSL signal or another corresponding signal is used in the connection between the terminal equipment 19 and the frame part. The terminal equipment can move as shown by arrow 150 from the coverage area 220 to the coverage area 221.

The base station transmits on an agreed radio frequency a pilot signal or the like containing the address information of the base station. The above-mentioned signal can also comprise a "dial tone" and a "busy tone". The dial tone indicates that the base station is free to establish a connection. The busy tone indicates that the base station is already reserved by another terminal equipment. Neighboring base stations transmit their dial tones on different radio frequencies. The same dial tone can be used by a base station which is sufficiently far away from another base station transmitting the same dial signal frequency. This avoids unnecessary reservation of base stations.

When the base station receives a call request sent by a user, the base station changes its dial tone to a busy tone. After this, the terminal equipment can start actual data transmission through the base station onward. At this time, the base station can also start transmitting signals coming from the network to the terminal equipment calling the base station. The base station transmits a modulated broadband xDSL signal to the terminal equipment and a voice-frequency signal of a land line phone. After the connection is ended, the base station starts transmitting the dial tone again.

When an operating voltage is switched on in terminal equipment, the terminal equipment starts listening for a pilot tone by going through predefined radio frequencies. The address of a base station having the strongest dial tone is detected and the exchange of handshaking signals can be started on the frequency corresponding to this base station. When the radio link is established, packet-switched traffic between the IPP block and the service provider's server can be started. The terminal equipment transmits the detected address to the service provider. After this, the server starts to transmit packets comprising information to the base station address it has received.

When the terminal equipment moves in the radio system, it continuously listens for signals transmitted by base stations that can be certain kinds of pilot signals. When the terminal equipment detects a base station which transmits a stronger pilot signal than that transmitted by the base station to which the terminal equipment has already established a connection, the terminal equipment transmits the address of the base station transmitting the stronger signal to the server. After this, the server starts transmitting packets to the address from which the terminal equipment received the strongest signal.

Establishing a connection from the terminal equipment to the server, for instance, is done as follows. First let us assume that the terminal equipment receives from several base stations connected to a cable a signal which comprises information that said base station is free to establish a connection to the terminal equipment. The signal transmitted by the base station comprises address information, such as the telephone number and network address of the base station. It is advantageous for the terminal equipment to establish a connection with the base station whose signal is received the strongest by the terminal equipment.

When the terminal equipment establishes a connection to the server, the terminal equipment transmits the address information received from the base station to the server. After this, the server can transmit the service information the terminal equipment wants to the network address of the base station through which the service request arrived.

The IPP block of the terminal equipment transmits a packet-switched signal to the server only whose information and encryption methods, for instance, are stored in the identification means 197d in the terminal equipment. The server transmits packets to the address which the terminal equipment has sent to it. The terminal equipment 19 is a portable DSL mobile phone, for instance, whose data transmission rate is extremely high. The terminal equipment can quickly browse multimedia data, for instance, on the server 10 of the service provider.

The system presented in FIG. 20 can be a radio system, for instance, which in principle functions in the same manner as the present mobile systems. A difference to be noted is, however, that in the established connection the user can use data transmission rates which are considerably higher than the present ones. Higher data transmission rates are possible because the terminal equipment and the frame part acting as a base station are in contact with each other by means of an xDSL signal transmitted over the air path.

The signal transmitted by the terminal equipment 19 is transmitted to a base station connected to a telephone plug box and from there on to a data transmission network by a conventional telephone cable. The presented system is relatively easy to implement because there are already quite a lot of copper telephone cables, for instance, and telephone plug boxes in offices and densely populated areas.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. Terminal equipment comprising:
a frame part which comprises a DSL block for removing the format of an xDSL-formatted signal received by the terminal equipment; and
a part disconnectable from the frame part and comprising a memory for storing information in the deformatted signal,
the DSL block being arranged to generate an xDSL signal and to transmit the generated xDSL signal outside the terminal equipment,
the frame part further comprising a generator arranged to transmit a signal to the disconnectable part, the disconnectable part further comprising a detector arranged to detect on the basis of the signal transmitted by the generator that a first transceiver is free to establish a connection to a second transceiver.

2. Terminal equipment comprising:
a frame part which comprises a DSL block for removing the format of an xDSL-formatted signal received by the terminal equipment; and
a part disconnectable from the frame part and comprising a memory for storing information in the deformatted signal,
the DSL block being arranged to generate an xDSL signal and to transmit the generated xDSL signal outside the terminal equipment,
the frame part further comprising a generator arranged to transmit a signal to the disconnectable part, the disconnectable part further comprising a detector arranged to detect on the basis of the signal transmitted by the generator that a first transceiver has an ongoing connection.

3. Terminal equipment comprising:
a frame part which comprises a transceiver for receiving an xDSL-formatted signal from an air path and for transmitting an xDSL signal to the air path; and
a part disconnectable from the frame part and comprising a DSL block for generating a signal in xDSL format and for removing the format of an xDSL-formatted signal received from the air path.
the disconnectable part further comprising a transceiver for receiving an xDSL-formatted signal from the air path and for transmitting an xDSL signal to the air path,
the frame part further comprising a generator arranged to transmit a signal to the disconnectable part, the disconnectable part further comprising a detector arranged to detect on the basis of the signal transmitted by the generator that a first transceiver is free to establish a connection to a second transceiver.

4. Terminal equipment comprising:
a frame part which comprises a transceiver for receiving an xDSL-formatted signal from an air path and for transmitting an xDSL signal to the air path; and
a part disconnectable from the frame part and comprising a DSL block for generating a signal in xDSL format and for removing the format of an xDSL-formatted signal received from the air path,
the disconnectable part further comprising a transceiver for receiving an xDSL-formatted signal from the air path and for transmitting an xDSL signal to the air path,
the frame part further comprising a generator arranged to transmit a signal to the disconnectable part, the disconnectable part further comprising a detector arranged to detect on the basis of the signal transmitted by the generator that a first transceiver has an ongoing connection.

5. A data transmission system, comprising:
a first transceiver comprising a DSL block and a generator, the DSL block arranged to receive an xDSL signal and to remove the xDSL format, the generator arranged to transmit a signal to an air path;
a second transceiver comprising a detector and a memory, the detector arranged to detect the signal transmitted by the generator, the memory arranged to store the xDSL signal deformatted by the DSL block, the second transceiver being arranged on the basis of the signal received by the detector to detect the readiness of the first transceiver to start establishing a connection to said second transceiver; and a cable connected to the first transceiver, the cable arranged to connect the first transceiver to the data transmission system, the first and second transceiver further comprising a connection means for connecting the first and second transceiver to each other and for disconnecting the first and second transceiver from each other, the second transceiver being arranged to transmit information to the DSL block of the first transceiver, the block being arranged to generate an xDSL signal into which the information transmitted by the second transceiver is inputted, and the first transceiver being arranged to transmit, via said cable, the generated xDSL signal to the data transmission system.

6. A data transmission system, comprising:

a first transceiver comprising a generator arranged to transmit a signal to an air path; and a second transceiver comprising a detector arranged to detect the signal transmitted by the generator, the second transceiver being arranged on the basis of the signal received by the detector to detect the readiness of the first transceiver to start establishing a connection to the second transceiver, the first transceiver being arranged to receive a broadband xDSL signal, to modulate a carrier with the received xDSL signal, and to transmit the modulated carrier over the air path to the second transceiver, and the second transceiver being arranged to receive the carrier transmitted by the first transceiver and to demodulate the xDSL signal modulated into the carrier, the second transceiver comprising a DSL block arranged to remove the xDSL format of the demodulated xDSL signal.

7. A data transmission system, comprising:

a first transceiver comprising a generator arranged to transmit a signal to an air path;

a second transceiver comprising a detector arranged to detect the signal transmitted by the generator, the second transceiver being arranged on the basis of the signal received by the detector to detect the readiness of the first transceiver to start establishing a connection to said second transceiver;

a server; and a third transceiver arranged to receive a signal from the server and to generate an xDSL signal into which the signal received from the server is inputted, the third transceiver being arranged to transmit the xDSL signal to the first transceiver, the first and the second transceiver each comprising connection means to galvanically connect the first and the second transceiver to each other, the first transceiver being arranged to transmit to the second transceiver the signal received from the third transceiver, either in the xDSL format or with the xDSL format removed, over the air path or through the connection means, the second transceiver being arranged to transmit to the first transceiver the signal, either in the xDSL format or with the xDSL format removed, over the air path or through the connection means, the first transceiver being arranged to generate an xDSL format and to transform the signal received from the second transceiver into the xDSL format, if the signal coming from the second transceiver is transmitted without said format, and the first transceiver being arranged to transmit the xDSL-format signal to the third transceiver, the third transceiver being arranged to remove the format of the received xDSL-format signal and to transmit the signal inside the format to the server.

8. A data transmission system as claimed in claim 6, wherein the second transceiver is arranged to establish several simultaneous xDSL connections to be transmitted over the air path to the first transceiver.

9. A data transmission system as claimed in claim 7, wherein the second transceiver is arranged to establish several simultaneous xDSL connections to be transmitted over the air path to the first transceiver.

10. Terminal equipment as claimed in claim 1, wherein the disconnectable part comprises a display for displaying the information in the xDSL signal.

11. Terminal equipment as claimed in claim 3, wherein the disconnectable part comprises a memory for storing the information in the xDSL signal.

12. Terminal equipment as claimed in 2, wherein the terminal equipment comprises a block arranged for receiving and transmitting a voice signal.

13. Terminal equipment as claimed in 4, wherein the terminal equipment comprises a block arranged for establishing a mobile telephone connection.

14. A data transmission system as claimed in claim 6, further comprising an individual pair cable for the first transceiver, the cable being arranged to connect the first transceiver to the data transmission system.

15. A data transmission system as claimed in claim 5, wherein the second transceiver is arranged to establish several simultaneous xDSL connections to be transmitted over the air path to the first transceiver.

16. A data transmission system as claimed in claim 5, wherein the first transceiver is arranged to transmit to the second transceiver a signal which comprises the telephone number and/or network address of the first transceiver.

17. A data transmission system as claimed in claim 5, further comprising a switched telephone network, mobile network and packet-switched data transmission network, to each of which the second transceiver is arranged to establish a connection.

* * * * *